US 12,032,390 B2
(12) United States Patent
Zheng

(10) Patent No.: US 12,032,390 B2
(45) Date of Patent: Jul. 9, 2024

(54) AUTONOMOUS LANDING METHOD AND APPARATUS OF UNMANNED AERIAL VEHICLE AND UNMANNED AERIAL VEHICLE

(71) Applicant: AUTEL ROBOTICS CO., LTD., Guangdong (CN)

(72) Inventor: Xin Zheng, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 353 days.

(21) Appl. No.: 17/352,697

(22) Filed: Jun. 21, 2021

(65) Prior Publication Data

US 2022/0075391 A1 Mar. 10, 2022

Related U.S. Application Data

(63) Continuation of application No. PCT/CN2019/126720, filed on Dec. 19, 2019.

(30) Foreign Application Priority Data

Dec. 20, 2018 (CN) .......................... 201811563917.7

(51) Int. Cl.
*G05D 1/10* (2006.01)
*B64C 39/02* (2023.01)
(Continued)

(52) U.S. Cl.
CPC ........... *G05D 1/101* (2013.01); *B64C 39/024* (2013.01); *G01C 21/3889* (2020.08);
(Continued)

(58) Field of Classification Search
CPC ...... B64C 39/024; B64U 10/13; B64U 70/00; G01C 21/3889; G01C 21/3896; G05D 1/101
See application file for complete search history.

(56) References Cited

U.S. PATENT DOCUMENTS

| 10,121,117 B1 * | 11/2018 | Boyd | G06V 20/13 |
| 11,017,679 B2 * | 5/2021 | Moster | G08G 5/0039 |

(Continued)

FOREIGN PATENT DOCUMENTS

| AU | 2013237730 A1 * | 6/2014 | ............ A01G 23/00 |
| AU | 2013237730 B2 * | 5/2015 | ............ A01G 23/00 |

(Continued)

OTHER PUBLICATIONS

Min Yang et al; "Aquisition and Processing of 3D Point Cloud Data in Debris-flow Channel and its Visualization", Journal of Kunming University of Science and Technology (Natural Science) vol. 43, No. 4, Aug. 2018; 8 pages.

(Continued)

*Primary Examiner* — Shelley Chen
(74) *Attorney, Agent, or Firm* — Frank Gao, Esq.

(57) ABSTRACT

The autonomous landing method of a UAV includes: obtaining a point cloud distribution map of a planned landing region; determining a detection region in the point cloud distribution map according to an actual landing region of the UAV in the point cloud distribution map; dividing the detection region into at least two designated regions, each of the at least two designated regions corresponding to a part of the planned landing region; determining whether a quantity of point clouds in each of the at least two designated regions is less than a preset threshold; and if a quantity of point clouds in a designated region is less than the preset threshold, controlling the UAV to fly away from the designated region of which the quantity of point clouds is less than the preset threshold, or controlling the UAV to stop landing.

20 Claims, 4 Drawing Sheets

(51) Int. Cl.
  *G01C 21/00* (2006.01)
  *G05D 1/00* (2006.01)
  *B64U 10/13* (2023.01)
  *B64U 70/00* (2023.01)

(52) U.S. Cl.
  CPC .......... *G01C 21/3896* (2020.08); *B64U 10/13* (2023.01); *B64U 70/00* (2023.01)

(56) References Cited

U.S. PATENT DOCUMENTS

| | | | | |
|---|---|---|---|---|
| 2010/0296705 | A1* | 11/2010 | Miksa | G01C 21/3848 382/106 |
| 2013/0282208 | A1* | 10/2013 | Mendez-Rodriguez | G01S 17/933 701/16 |
| 2016/0378121 | A1* | 12/2016 | Shue | G05D 1/0072 701/7 |
| 2017/0283087 | A1 | 10/2017 | McNeill | |
| 2018/0204469 | A1* | 7/2018 | Moster | G01C 11/02 |

FOREIGN PATENT DOCUMENTS

| | | | | |
|---|---|---|---|---|
| CA | 2829169 | A1 | * 6/2014 | ............ A01G 23/00 |
| CN | 103365299 | A | * 10/2013 | |
| CN | 105204515 | A | * 12/2015 | |
| CN | 105775150 | A | 7/2016 | |
| CN | 107291093 | A | * 10/2017 | |
| CN | 107291093 | A | 10/2017 | |
| CN | 107444665 | A | 12/2017 | |
| CN | 109343572 | A | 2/2019 | |

OTHER PUBLICATIONS

Jian-Yu Huang, et al; "Method for identifying the landing area of unmanned aerial vehicle", Chinese Journal of Liquid Crystals and Displays, vol. 33, No. 3, Mar. 2018, 11 pages.
International Search Report dated Feb. 26, 2020; PCT/CN2019/126720.
Second Chinese Office Action dated Jan. 6, 2021; Appln. No. 201811563917.7.

* cited by examiner

AUTONOMOUS LANDING METHOD AND APPARATUS OF UNMANNED AERIAL VEHICLE AND UNMANNED AERIAL VEHICLE

CROSS REFERENCE

This application is a continuation of International Application No. PCT/CN2019/126720, filed on Dec. 19, 2019, which claims priority to Chinese Patent Application No. 2018115639177 filed on Dec. 20, 2018, which is incorporated herein by reference in its entirety.

BACKGROUND

Technical Field

Embodiments of the present invention relate to the field of unmanned aerial vehicle (UAV) control technologies, and in particular, to an autonomous landing method and apparatus of a UAV and a UAV.

Related Art

A UAV is a pilotless aircraft operated by a radio remote control device or a built-in program control apparatus. With the development of technologies related to a UAV and complex changes in application scenarios of the UAV, there are an increasing number of safety problems of the UAV in flight. Therefore, the UAV is equipped with autonomous landing protection technologies, to avoid a crash of the UAV during landing in an unknown environment.

However, during implementation of the present invention, the inventor finds that: currently, the autonomous landing protection technologies equipped in the UAV are only used for analyzing an overall situation of a planned landing region, and can detect only the overall flatness of the planned landing region but cannot detect dangerous regions such as a rooftop, a cliff and a deep ditch that are flat but have obvious edge gaps. As a result, the detection is insufficiently comprehensive, and there is still a crash risk during landing of the UAV.

SUMMARY

Embodiments of the present invention are intended to provide an autonomous landing method and apparatus of a UAV and a UAV, which can implement local detection of a UAV, improve accuracy of detection, and reduce a crash risk of the UAV.

To resolve the foregoing technical problem, a technical solution adopted in the embodiments of the present invention is as follows: An autonomous landing method of a UAV is provided, the method including:
  obtaining a point cloud distribution map of a planned landing region;
  determining a detection region in the point cloud distribution map according to an actual landing region of the UAV in the point cloud distribution map, the detection region being a region, used for detecting a quantity of point clouds, in the point cloud distribution map;
  dividing the detection region into at least two designated regions, each of the at least two designated regions corresponding to a part of the planned landing region;
  determining whether a quantity of point clouds in each of the at least two designated regions is less than a preset threshold; and
  if a quantity of point clouds in a designated region is less than the preset threshold, controlling the UAV to fly away from the designated region of which the quantity of point clouds is less than the preset threshold, or controlling the UAV to stop landing.

Optionally, the obtaining a point cloud distribution map of a planned landing region includes:
  obtaining the point cloud distribution map of the planned landing region by using a depth sensor of the UAV.

Optionally, the obtaining the point cloud distribution map of the planned landing region by using a depth sensor of the UAV includes:
  obtaining a depth map of the planned landing region by using the depth sensor; and
  obtaining the point cloud distribution map according to the depth map.

Optionally, the obtaining the point cloud distribution map of the planned landing region by using a depth sensor of the UAV includes:
  obtaining point cloud data of the planned landing region by using the depth sensor; and
  projecting the point cloud data to a two-dimensional plane, to obtain the point cloud distribution map.

Optionally, the detection region is obtained by subtracting the actual landing region from a region corresponding to the point cloud distribution map and adding a region formed by a tolerable danger error.

Optionally, the point cloud distribution map is of a rectangular structure, and the at least two designated regions include:
  a first designated region located on a left side of a landing region, a second designated region located on a right side of the landing region, a third designated region located on an upper side of the landing region and a fourth designated region located on a lower side of the landing region.

Optionally, the detection region does not include regions in which four corners are located in the point cloud distribution map.

Optionally, mathematical expressions of the first designated region S1, the second designated region S2, the third designated region S3 and the fourth designated region S4 are respectively as follows:

$$-\text{length} < x_1 < -(l-d), y_1 < |w-d|, \qquad \text{S1:}$$

$$(l-d) < x_2 < \text{length}, y_2 < |w-d|, \qquad \text{S2:}$$

$$x_3 < |l-d|, (w-d) < y_3 < \text{width}, \qquad \text{S3: and}$$

$$x_4 < |l-d|, -\text{width} < y_4 < -(w-d), \qquad \text{S4:}$$

where $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

Optionally, the preset threshold is a value within a range of 15 to 50.

To resolve the foregoing technical problem, another technical solution adopted in the embodiments of the present invention is as follows: An autonomous landing apparatus of a UAV is provided, the apparatus including:

an obtaining module, configured to obtain a point cloud distribution map of a planned landing region;

a first determining module, configured to determine a detection region in the point cloud distribution map according to an actual landing region of the UAV in the point cloud distribution map, the detection region being a region, used for detecting a quantity of point clouds, in the point cloud distribution map;

a division module, configured to divide the detection region into at least two designated regions, each of the at least two designated regions corresponding to a part of the planned landing region;

a second determining module, configured to determine whether a quantity of point clouds in each of the at least two designated regions is less than a preset threshold; and a control module, configured to: if a quantity of point clouds in each designated region is less than the preset threshold, control the UAV to fly away from the designated region of which the quantity of point clouds is less than the preset threshold, or control the UAV to stop landing.

Optionally, the obtaining module obtains the point cloud distribution map of the planned landing region by using a depth sensor of the UAV.

Optionally, the obtaining module is further configured to:
obtain a depth map of the planned landing region by using the depth sensor; and
obtain the point cloud distribution map according to the depth map.

Optionally, the obtaining module is further configured to:
obtain point cloud data of the planned landing region by using the depth sensor; and
project the point cloud data to a two-dimensional plane, to obtain the point cloud distribution map.

Optionally, the detection region is obtained by subtracting the actual landing region from a region corresponding to the point cloud distribution map and adding a region formed by a tolerable danger error.

Optionally, the point cloud distribution map is of a rectangular structure, and the at least two designated regions include:

a first designated region located on a left side of a landing region, a second designated region located on a right side of the landing region, a third designated region located on an upper side of the landing region and a fourth designated region located on a lower side of the landing region.

Optionally, the detection region does not include regions in which four corners are located in the point cloud distribution map.

Optionally, mathematical expressions of the first designated region S1, the second designated region S2, the third designated region S3 and the fourth designated region S4 are respectively as follows:

$$-\text{length} \le x_1 \le -(l-d), y_1 < |w-d|, \qquad S1:$$

$$(l-d) < x_2 \le \text{length}, y_2 < |w-d|, \qquad S2:$$

$$x_3 < |l-d|, (w-d) < y_3 \le \text{width}, \qquad S3: \text{and}$$

$$x_4 < |l-d|, -\text{width} \le y_4 \le -(w-d), \qquad S4:$$

where $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

Optionally, the preset threshold is a value within a range of 15 to 50.

To resolve the foregoing technical problem, another technical solution adopted in the embodiments of the present invention is as follows: a UAV is provided, including:

at least one processor; and
a memory communicatively connected to the at least one processor, the memory storing instructions executable by the at least one processor, the instructions being executed by the at least one processor, to enable the at least one processor to be configured to perform the foregoing autonomous landing method of a UAV.

To resolve the foregoing technical problem, another technical solution adopted in the embodiments of the present invention is as follows: A non-volatile computer-readable storage medium is provided, storing computer-executable instructions, the computer-executable instructions being configured to cause a UAV to perform the foregoing autonomous landing method of a UAV.

The embodiments of the present invention have the following beneficial effects: Different from the prior art, the embodiments of the present invention provide an autonomous landing method and apparatus of a UAV and a UAV. In the autonomous landing method of a UAV, designated regions are obtained through division in a point cloud distribution map of a planned landing region, and a quantity of point clouds in each designated region is determined to implement local detection. Compared with overall detection for the planned landing region, during the local detection for a designated region, there are a smaller quantity of point clouds, so that the UAV can determine each dangerous designated region more accurately, thereby improving accuracy of detection and reducing a crash risk of the UAV.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, technical solutions and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. It should be understood that the specific embodiments described herein are merely used to explain the present invention but are not intended to limit the present invention. All other embodiments obtained by a person of ordinary skill in the art based on the embodiments of the present invention without creative efforts shall fall within the protection scope of the present invention.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right" and similar expressions used in this specification are merely used for an illustrative purpose.

In addition, technical features involved in the embodiments of the present invention described below may be combined with each other provided that there is no conflict between each other.

The present invention provides an autonomous landing method and apparatus of a UAV. The method and apparatus are applicable to a UAV, to enable the UAV to determine whether there is a local dangerous region in a planned landing region during landing preparation. If there is a local dangerous region, the UAV is controlled to fly away from the local dangerous region or the UAV is controlled to stop landing, to prevent the UAV from landing in the local dangerous region to avoid crashing. In the embodiments of the present invention, local dangerous regions are edge gap regions of a flat-surface region such as a rooftop, a cliff and a deep ditch.

The UAV in the present invention may be any suitable type of high-altitude UAV or low-altitude UAV, including a fixed-wing UAV, a rotary-wing UAV, a para-wing UAV, a flapping-wing UAV, or the like.

The present invention will be described below by using specific embodiments.

Embodiment 1

Figure 1:
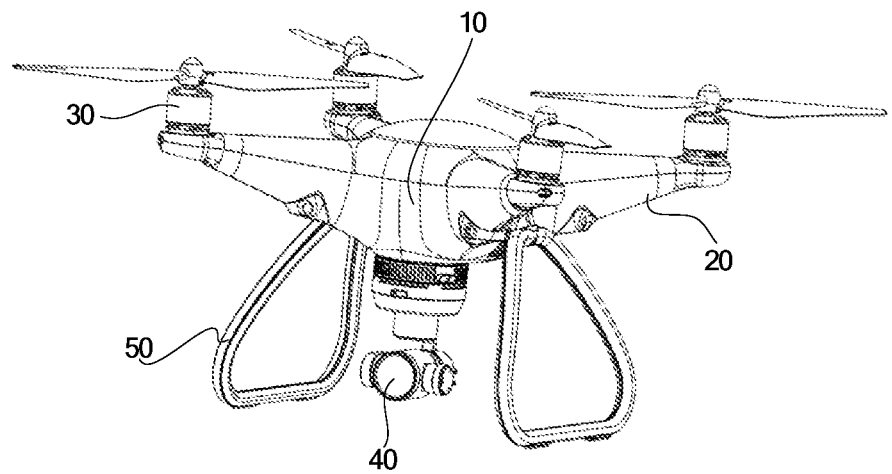
FIG. 1 is a schematic structural diagram of a UAV according to an embodiment of the present invention.

FIG. 1 shows a UAV 100 according to an embodiment of the present invention, including a housing 10, an arm 20, a power apparatus 30, a depth sensor 40, an undercarriage 50 and a flight control system (not shown). The arm 20, the depth sensor 40 and the undercarriage 50 are all connected to the housing 10. The flight control system is disposed inside the housing 10. The power apparatus 30 is disposed on the arm 20. The power apparatus 30, the depth sensor 40 and the undercarriage 50 are all communicatively connected to the flight control system, so that the flight control system can control the flight of the UAV 100 by using the power apparatus 30, obtain a point cloud distribution map of a planned landing region of the UAV 100 by using the depth sensor 40, and control the undercarriage 50 to be in contact with the ground.

Preferably, there are four arms 20, which are evenly distributed around the housing 10 to carry the power apparatus 30.

The power apparatus 30 includes a motor and a propeller connected to a shaft of the motor. The motor can drive the propeller to rotate to provide an elevating force for the UAV 100 to implement flight, and can further change a flight direction of the UAV 100 by changing a rotating speed and direction of the propeller. When the power apparatus 30 is communicatively connected to the flight control system, the flight control system can control the flight of the UAV 100 by controlling the motor.

The power apparatus 30 is disposed at an end, unconnected to the housing 10, of the arm 20, and is connected to the arm 20 by the motor.

Preferably, each of the four arms of the UAV 100 is provided with a power apparatus to allow the UAV 100 to fly stably.

The depth sensor 40 is disposed at the bottom of the housing 10, and is configured to acquire a depth map of a planned landing region of the UAV 100. The depth map is an image or an image channel including information related to a distance to a surface of a scene object at a viewpoint. In the depth map, each pixel value represents an actual distance from the depth sensor to an object. Therefore, when acquiring the depth map, the depth sensor 40 acquires the actual distance between the depth sensor 40 and the object in the planned landing region. When the depth sensor 40 is communicatively connected to the flight control system, the flight control system can obtain the depth map of the planned landing region of the UAV 100 from the depth sensor 40, and obtain a point cloud distribution map of the planned landing region according to the depth map.

Certainly, in some other embodiments, the depth sensor 40 is configured to acquire point cloud data of the planned landing region of the UAV 100. In the point cloud data, each point includes three-dimensional coordinates, and some points may include color information or reflection intensity information. In this case, when the depth sensor 40 is communicatively connected to the flight control system, the flight control system can obtain the point cloud data of the planned landing region of the UAV 100 from the depth sensor 40, and project the point cloud data to a two-dimensional plane, to obtain a point cloud distribution map of the planned landing region.

Further, the depth sensor 40 is disposed at the bottom of the housing 10 by using a gimbal, so that the depth sensor 40 can acquire the depth map or the point cloud data of the planned landing region in all directions.

The depth sensor 40 includes, but is not limited to, a binocular camera, a time of flight (TOF) camera, a structured light camera and a lidar.

The undercarriage 50 is disposed on two opposite sides at the bottom of the housing 10, and is connected to the housing 10 by a driving apparatus. The undercarriage 50 can open and fold under drive of the driving apparatus. When the UAV 100 is in contact with the ground, the driving apparatus controls the undercarriage 50 to open, so that the UAV 100 is in contact with the ground by using the undercarriage 50. During the flight of the UAV 100, the driving apparatus controls the undercarriage 50 to fold, to prevent the undercarriage 50 from affecting the flight of the UAV 100. When the undercarriage 50 is communicatively connected to the flight control system, the flight control system can control, by controlling the driving apparatus, the undercarriage 50 to be in contact with the ground.

It may be understood that, when landing on the ground, the UAV 100 is in contact with the ground by only using the undercarriage 50. In this case, the actual landing region of the UAV 100 is a region enclosed when the undercarriage 50 is in contact with the ground.

When the UAV 100 is in contact with the ground by using the undercarriage 50, a projection of a body of the UAV 100 on the ground encloses a projection region. A center point of the projection region overlaps with a center point of the actual landing region. The projection region is larger than the actual landing region. The projection region includes a movement range of the propeller, and represents a smallest region in which the UAV 100 can normally move.

The flight control system is communicatively connected to the power apparatus 30, the depth sensor 40 and the undercarriage 50 through a wired connection or a wireless connection. The wireless connection includes, but is not limited to, Wi-Fi, Bluetooth and ZigBee.

The flight control system is configured to perform the autonomous landing method of a UAV described in the present invention, so that the UAV 100 can implement local detection, to improve accuracy of detection, and reduce a crash risk of the UAV.

Specifically, when the UAV 100 prepares to land, the flight control system obtains the point cloud distribution map of the planned landing region by using the depth sensor 40.

The planned landing region is a region that is determined according to a current UAV landing protection method, has a flat surface, and is suitable for landing of a UAV, and includes a region such as the ground, a rooftop, a platform or a cliff. There may be edge gap regions such as a cliff and a rooftop in regions that have a flat surface and are suitable for landing of a UAV. If local danger determination is not performed for an edge gap region, when the UAV 100 lands in the edge gap region, the UAV is likely to land at an edge to crash. Therefore, in the present invention, danger detection is performed based on a planned landing region that has a flat surface and is suitable for landing of the UAV 100.

The point cloud distribution map is a schematic diagram that can reflect a point cloud distribution of the planned landing region.

The flight control system obtains a point cloud distribution map of a planned landing region with the center of the UAV as the center.

In an embodiment of the present invention, that the flight control system obtains the point cloud distribution map of the planned landing region by using the depth sensor 40 specifically includes: obtaining, by the flight control system, a depth map of the planned landing region by using the depth sensor 40, and obtaining the point cloud distribution map according to the obtained depth map.

In another embodiment of the present invention, that the flight control system obtains the point cloud distribution map of the planned landing region by using the depth sensor 40 specifically includes: obtaining, by the flight control system, point cloud data of the planned landing region by using the depth sensor 40, and projecting the obtained point cloud data to a two-dimensional plane, to obtain the point cloud distribution map.

Further, after obtaining the point cloud distribution map of the planned landing region, the flight control system determines a detection region in the point cloud distribution map according to an actual landing region of the UAV 100 in the point cloud distribution map.

The planned landing region is a determined region that has a flat surface and is suitable for landing of the UAV 100, so that in this case, a problem that the propeller rotates to collide with an obstacle does not need to be considered, and only a problem that whether the UAV 100 is to land in an edge gap region needs to be considered. Whether to land in an edge gap region is related to a landing position of the undercarriage 50 of the UAV, that is, related to an actual landing region of the UAV 100. Therefore, in the present invention, the flight control system determines the detection region in the point cloud distribution map according to the actual landing region of the UAV 100 in the point cloud distribution map.

The detection region is a region, used for detecting a quantity of point clouds, in the point cloud distribution map.

In an embodiment of the present invention, because the UAV 100 has a detection error during actual detection, the UAV 100 has a tolerable danger error during actual landing. The tolerable danger error is a maximum distance by which the UAV 100 can be allowed to enter a gap region. That is, when the UAV 100 lands in the edge gap region at a distance of the tolerable danger error, the UAV 100 does not crash. Therefore, during determination of the detection region, a region formed by the tolerable danger error needs to be considered together. Specifically, the detection region is obtained by subtracting the actual landing region from a region corresponding to the point cloud distribution map and adding a region formed by the tolerable danger error. In this case, the determined detection region is a maximum detection region, so that a detection result can be more accurate, thereby avoiding omission of detection on the region formed by the tolerable danger error. The tolerable danger error depends on the size of the UAV 100 and accuracy of the depth sensor 40, and is a value within a range of 1 cm to 5 cm, including 1 cm and 5 cm.

Figure 2:
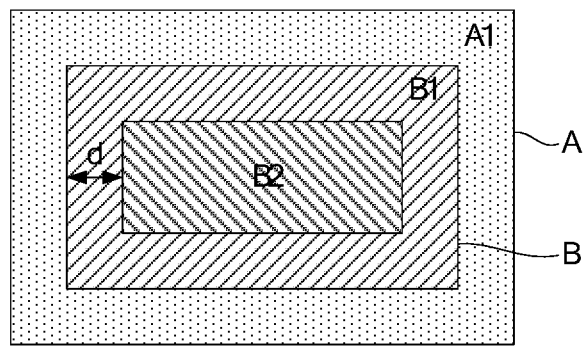
FIG. 2 is a relationship diagram of regions according to an embodiment of the present invention.

Referring to FIG. 2, the region corresponding to the point cloud distribution map is the planned landing region. The planned landing region is A, and the actual landing region is B. When the actual landing region B is subtracted from the region A corresponding to the point cloud distribution map, a region A1 is obtained. The region formed by the tolerable danger error d is B1. When the actual landing region B is subtracted from the region A corresponding to the point cloud distribution map and the region B1 formed by the tolerable danger error is added, an obtained detection region is A1+B1.

Still referring to FIG. 2, after the region B1 formed by the tolerable danger error d is subtracted from the actual landing region B, a landing region B2 is obtained. The landing region B2 may be alternatively a region obtained by subtracting the detection region A1+B1 from the region A corresponding to the point cloud distribution map. The landing region B2 is not used for detecting a quantity of point clouds.

Further, after determining the detection region in the point cloud distribution map, the flight control system divides the detection region into at least two designated regions, each of the at least two designated regions corresponding to a part of the planned landing region.

When dividing the detection region into at least two designated regions, the flight control system may divide the detection region into at least two designated regions having the same area, and may alternatively divide the detection region into at least two designated regions having different areas.

When dividing the detection region, the flight control system may perform division according to the landing region B2. For example, the flight control system may divide the detection region according to an extension line of at least one boundary line of the landing region B2, and may alternatively divide the detection region according to connection lines between at least two corners of the landing region B2 and corresponding corners of the planned landing region A.

Figure 3A:
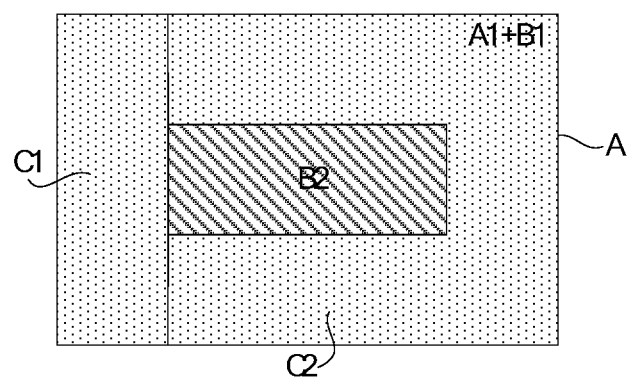
FIG. 3a is a schematic diagram of designated region division according to an embodiment of the present invention.

Referring to FIG. 3a, the flight control system divides, according to an extension line of a boundary line of the landing region B2, the detection region A1+B1 into a designated region C1 and a designated region C2 that have different areas.

Figure 3B:
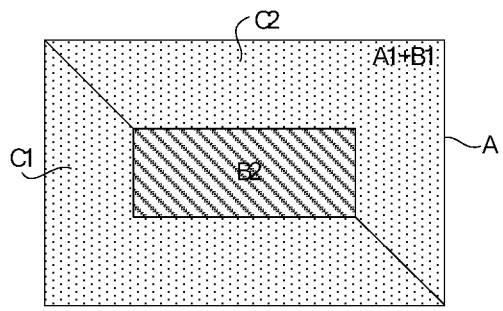
FIG. 3b is a schematic diagram of designated region division according to an embodiment of the present invention.

Referring to FIG. 3b, the flight control system divides, according to connection lines between two opposite corners of the landing region B2 and corresponding corners of the planned landing region A, the detection region A1+B1 into a designated region C1 and a designated region C2 that have the same area.

The foregoing descriptions merely show two embodiments of the present invention, and a solution obtained through any combination of the foregoing methods is a solution that can be implemented in the present invention.

Figure 4A:
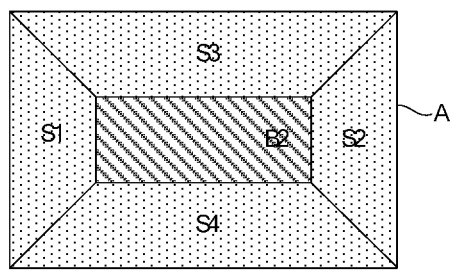
FIG. 4a is a schematic diagram of designated region division according to an embodiment of the present invention.

In an embodiment of the present invention, the point cloud distribution map is of a rectangular structure, and the flight control system divides the detection region into four designated regions. As shown in FIG. 4a, the four designated regions obtained through division include: a first designated region S1 located on a left side of the landing region B2, a second designated region S2 located on a right side of the landing region B2, a first designated region S3 located on an upper side of the landing region B2 and a fourth designated region S4 located on a lower side of the landing region B2. The designated regions are respectively obtained through division in four directions of the landing region B2, which comprehensively considers cases that may occur in an edge gap region, thereby improving accuracy of detection.

The "left side", "right side", "upper side" and "lower side" are all directions shown in the figure.

Figure 4B:
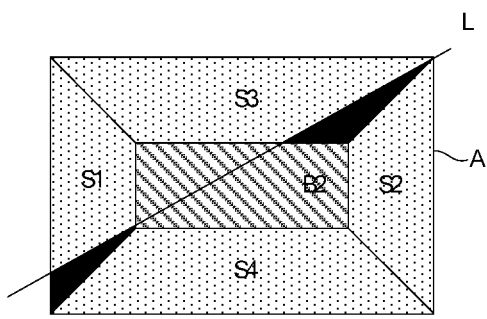
FIG. 4b is a schematic diagram of designated regions shown in FIG. 4a in a diagonal danger boundary L.

As shown in FIG. 4b, a region on the left of a diagonal danger boundary L is a dangerous region, and a region on the right of the diagonal danger boundary L is a safe region. When whether designated regions in the diagonal danger boundary L are dangerous is determined according to the designated regions obtained through division in FIG. 4a, a quantity of point clouds in the first designated region S1 and the second designated region S2 (the black regions shown in the figure) is greater than a threshold. The flight control system determines that the first designated region S1 and the second designated region S2 are safe, and landing can be performed there. However, in practice, the first designated region S1 and the second designated region S2 are unsafe, and landing in the two regions is prone to a crash. That is, by means of the designated region division method shown in FIG. 4a, danger of the diagonal danger boundary cannot be accurately determined, and accuracy of detection is not high.

In another embodiment of the present invention, to improve accuracy of detecting the diagonal danger boundary, the detection region determined by the flight control system does not include regions in which four corners are located in the point cloud distribution map.

Figure 5A:
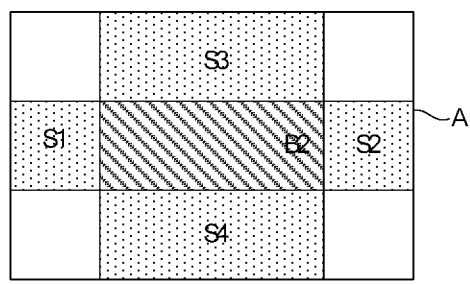
FIG. 5a is a schematic diagram of designated region division according to an embodiment of the present invention.

Specifically, referring to FIG. 5a, the flight control system subtracts, according to an extension line of a boundary line of the landing region B2, regions overlapping with the four corners of the detection region. After the regions in which the four corners of the detection region are located are subtracted, the detection region is divided into four designated regions shown in the figure, which include: a first designated region S1 located on a left side of the landing region B2, a second designated region S2 located on a right side of the landing region B2, a first designated region S3 located on an upper side of the landing region B2 and a fourth designated region S4 located on a lower side of the landing region B2.

Figure 5B:
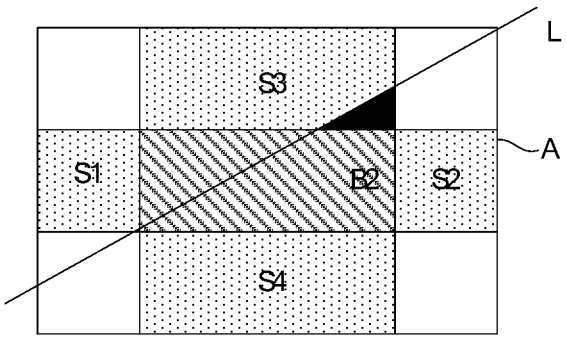
FIG. 5b is a schematic diagram of designated regions shown in FIG. 5a in a diagonal danger boundary L.

As shown in FIG. 5b, a region on the left of a diagonal danger boundary L is a dangerous region, and a region on the right of the diagonal danger boundary L is a safe region. When whether designated regions in the diagonal danger boundary L are dangerous is determined according to the designated regions obtained through division in FIG. 5a, a quantity of point clouds (the black region shown in the figure) in the first designated region S1 and the second designated region S2 is less than a threshold. The flight control system determines that the first designated region S1 and the second designated region S2 are safe, and landing can be performed there. In practice, the first designated region S1 and the second designated region S2 are safe. That is, by means of the designated region division method shown in FIG. 5a, accuracy of detection on the diagonal danger boundary can be improved.

In addition, the regions in which the four corners of the detection region are located in the point cloud distribution map are subtracted, so that data instability caused by distortion and the like can be avoided, thereby improving the stability of detection.

In an embodiment of the present invention, when the origin of a coordinate system is located at the center of the planned landing region, mathematical expressions of the first designated region S1, the second designated region S2, the third designated region S3 and the fourth designated region S4 shown in FIG. 5a are respectively as follows:

$$-\text{length} < x_1 \leq -(l-d), y_1 \leq |w-d|, \qquad \text{S1:}$$

$$(l-d) \leq x_2 < \text{length}, y_2 \leq |w-d|, \qquad \text{S2:}$$

$$x_3 \leq |l-d|, (w-d) \leq y_3 < \text{width}, \qquad \text{S3: and}$$

$$x_4 \leq |l-d|, -\text{width} < y_4 \leq -(w-d), \qquad \text{S4:}$$

where $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

Further, after dividing the detection region into at least two designated regions, the flight control system determines whether a quantity of point clouds in each of the at least two designated regions is less than a preset threshold, and if a quantity of point clouds in a designated region is less than the preset threshold, controls the UAV to fly away from the designated region of which the quantity of point clouds is less than the preset threshold, or controls the UAV to stop landing.

Specifically, the flight control system determines a quantity of point clouds in each designated region obtained through division. If a quantity of point clouds in each designated region is less than the preset threshold, it indicates that each designated region obtained through division is a dangerous region. That is, landing cannot be performed in the planned landing region. In this case, the flight control system controls the UAV to stop landing.

If a quantity of point clouds in at least one designated region is not less than the preset threshold, it indicates that there is at least one safe region in the designated regions obtained through division. In this case, the flight control system controls the UAV to fly away from a designated region of which a quantity of point clouds is less than the preset threshold, and fly toward a designated region of which a quantity of point clouds is not less than the preset threshold.

The preset threshold is determined according to accuracy based on which the depth sensor 40 acquires the depth map or the point cloud data, and is a value within a range of 15 to 50, including the two endpoint values 15 and 50.

In this embodiment of the present invention, designated regions are obtained through division in a point cloud distribution map of a planned landing region, and a quantity of point clouds in each designated region is determined to implement local detection. Compared with overall detection for the planned landing region, during the local detection for a designated region, there are a smaller quantity of point clouds, so that the UAV can determine each dangerous designated region more accurately, thereby improving accuracy of detection and reducing a crash risk of the UAV.

Embodiment 2

Figure 6:
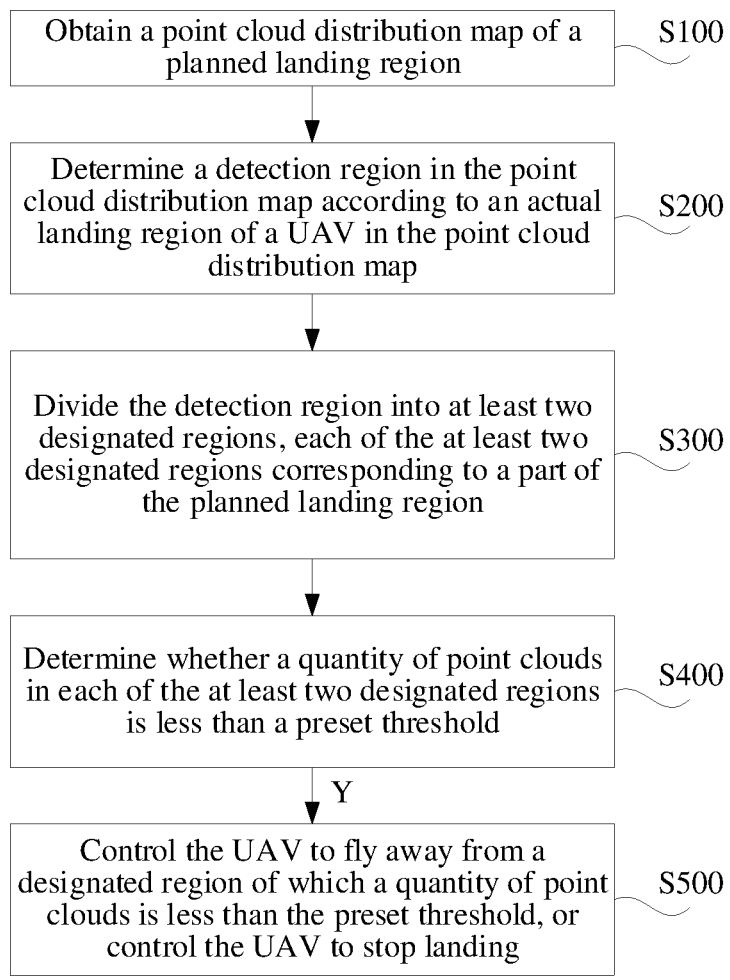
FIG. 6 is a schematic flowchart of an autonomous landing method of a UAV according to an embodiment of the present invention.

FIG. 6 is a schematic flowchart of an autonomous landing method of a UAV according to an embodiment of the present invention, which is applicable to a UAV. The UAV is the UAV 100 described in the foregoing embodiment. The method provided in this embodiment of the present invention is performed by the foregoing flight control system, and is used for implementing local detection of the UAV, thereby improving accuracy of detection and reducing a crash risk of the UAV during autonomous landing. The autonomous landing method of a UAV includes the following steps:

S100: Obtain a point cloud distribution map of a planned landing region.

The "planned landing region" is a region that is determined according to a current UAV landing protection method, has a flat surface, and is suitable for landing of a UAV. The planned landing region does not include a water surface, a bush, a slope and the like, and includes flat ground, a platform, a rooftop, a cliff and the like.

The "point cloud distribution map" is a schematic diagram that can reflect a point cloud distribution of the planned landing region.

During obtaining of the point cloud distribution map of the planned landing region, a point cloud distribution map with the center of the UAV as the center is preferably obtained.

In an embodiment of the present invention, the obtaining a point cloud distribution map of a planned landing region specifically includes: obtaining the point cloud distribution map of the planned landing region by using a depth sensor of the UAV.

The depth sensor includes, but is not limited to, a binocular camera, a TOF camera, a structured light camera and a lidar.

The depth sensor is configured to acquire a depth map or point cloud data of the planned landing region.

The depth map is an image or an image channel including information related to a distance to a surface of a scene object at a viewpoint. In the depth map, each pixel value represents an actual distance from the depth sensor to an object.

In the point cloud data, each point includes three-dimensional coordinates, and some points may include color information or reflection intensity information.

When the depth sensor acquires the depth map of the planned landing region, the obtaining the point cloud distribution map of the planned landing region by using a depth sensor of the UAV specifically includes:

obtaining a depth map of the planned landing region by using the depth sensor; and obtaining the point cloud distribution map according to the depth map.

When the depth sensor acquires the point cloud data of the planned landing region, the obtaining the point cloud distribution map of the planned landing region by using a depth sensor of the UAV specifically includes:

obtaining point cloud data of the planned landing region by using the depth sensor; and projecting the point cloud data to a two-dimensional plane, to obtain the point cloud distribution map.

S200: Determine a detection region in the point cloud distribution map according to an actual landing region of the UAV in the point cloud distribution map.

The "actual landing region" is a region enclosed when an undercarriage of the UAV is in contact with the ground. The actual landing region overlaps with a center point of the planned landing region in the point cloud distribution map.

The "detection region" is a region, used for detecting a quantity of point clouds, in the point cloud distribution map.

Because the UAV has a detection error during actual detection, the UAV has a tolerable danger error during actual landing. The tolerable danger error is a maximum distance by which the UAV can be allowed to enter a gap region. That is, when the UAV lands in the edge gap region at a distance of the tolerable danger error, the UAV does not crash.

Therefore, in an embodiment of the present invention, the detection region is obtained by subtracting the actual landing region from a region corresponding to the point cloud distribution map and adding a region formed by the tolerable danger error. In this case, the determined detection region is a maximum detection region, so that a detection result can be more accurate, thereby avoiding omission of detection on the region formed by the tolerable danger error.

The tolerable danger error depends on the size of the UAV 100 and accuracy of the depth sensor 40, and is a value within a range of 1 cm to 5 cm, including 1 cm and 5 cm.

S300: Divide the detection region into at least two designated regions, each of the at least two designated regions corresponding to a part of the planned landing region.

The "at least two designated regions" may be at least two designated regions having the same area, or may be at least two designated regions having different areas.

The detection region is divided into at least two designated regions according to a landing region. The landing region is a region obtained by subtracting the detection region from the region corresponding to the point cloud distribution map, and is not used for detecting a quantity of point clouds.

The dividing the detection region into at least two designated regions according to a landing region specifically includes: dividing the detection region into at least two designated regions according to an extension line of at least one boundary line of the landing region; or dividing the detection region into at least two designated regions according to connection lines between at least two corners of the landing region and corresponding corners of the planned landing region.

In an embodiment of the present invention, the point cloud distribution map is of a rectangular structure, and the at least two designated regions include:

- a first designated region located on a left side of a landing region, a second designated region located on a right side of the landing region, a third designated region located on an upper side of the landing region and a fourth designated region located on a lower side of the landing region.

The "left side", "right side", "upper side" and "lower side" are all directions shown in FIG. 4a.

The designated regions are respectively obtained through division in four directions of the landing region, which comprehensively considers cases that may occur in an edge gap region, thereby improving accuracy of detection.

In another embodiment of the present invention, to improve accuracy of detecting a diagonal danger boundary, the detection region does not include regions in which four corners are located in the point cloud distribution map.

Specifically, regions overlapping with the four corners of the detection region are subtracted according to an extension line of a boundary line of the landing region. After the regions in which the four corners of the detection region are located are subtracted, the detection region is divided into four designated regions shown in FIG. 5a, which include: a first designated region S1 located on a left side of the landing region, a second designated region S2 located on a right side of the landing region, a first designated region S3 located on an upper side of the landing region and a fourth designated region S4 located on a lower side of the landing region.

In this case, the first designated region S1, the second designated region S2, the third designated region S3 and the fourth designated region S4 are all rectangular, making calculation easier.

The regions in which the four corners of the detection region are located in the point cloud distribution map are subtracted, so that data instability caused by distortion and the like can be avoided, thereby improving the stability of detection.

Based on this, when the origin of a coordinate system is located at the center of the planned landing region, mathematical expressions of the first designated region S1, the second designated region S2, the third designated region S3 and the fourth designated region S4 shown in FIG. 5a are respectively as follows:

$$-\text{length} < x_1 < -(l-d), y_1 < |w-d|, \qquad \text{S1:}$$

$$(l-d) < x_2 < \text{length}, y_2 < |w-d|, \qquad \text{S2:}$$

$$x_3 < |l-d|, (w-d) < y_3 < \text{width}, \qquad \text{S3: and}$$

$$x_4 < |l-d|, -\text{width} < y_4 < -(w-d), \qquad \text{S4:}$$

where $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

S400: Determine whether a quantity of point clouds in each of the at least two designated regions is less than a preset threshold.

S500: If a quantity of point clouds in a designated region is less than the preset threshold, control the UAV to fly away from the designated region of which the quantity of point clouds is less than the preset threshold, or control the UAV to stop landing.

A quantity of point clouds in each designated region obtained through division is determined. If a quantity of point clouds in each designated region is less than the preset threshold, it indicates that each designated region obtained through division is a dangerous region. That is, landing cannot be performed in the planned landing region. In this case, the flight control system controls the UAV to stop landing.

If a quantity of point clouds in at least one designated region is not less than the preset threshold, it indicates that there is at least one safe region in the designated regions obtained through division. In this case, the flight control system controls the UAV to fly away from a designated region of which a quantity of point clouds is less than the preset threshold, and fly toward a designated region of which a quantity of point clouds is not less than the preset threshold.

The preset threshold is determined according to accuracy based on which the depth sensor acquires the depth map or the point cloud data, and is a value within a range of 15 to 50, including the two endpoint values 15 and 50.

The method embodiment and Embodiment 1 are based on the same concept. Therefore, for the content of the method embodiment, reference may be made to Embodiment 1 without mutual conflict among content, and details are not described herein again.

In this embodiment of the present invention, designated regions are obtained through division in a point cloud distribution map of a planned landing region, and a quantity of point clouds in each designated region is determined to implement local detection. Compared with overall detection for the planned landing region, during the local detection for a designated region, there are a smaller quantity of point clouds, so that the UAV can determine each dangerous designated region more accurately, thereby improving accuracy of detection and reducing a crash risk of the UAV.

Embodiment 3

The following term "module" may refer to a combination of software and/or hardware having a predetermined function. Although the apparatus described in the following embodiments may be implemented by using software, it is also conceivable that the apparatus may be implemented by using hardware, or a combination of software and hardware.

Figure 7:
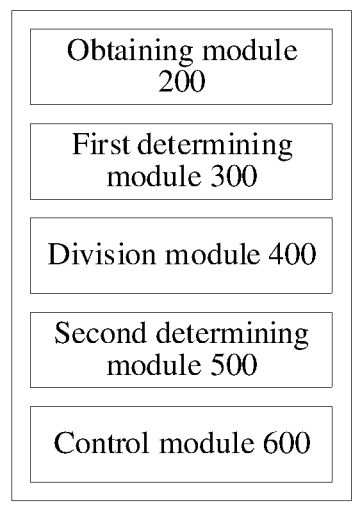
FIG. 7 is a schematic structural diagram of an autonomous landing apparatus of a UAV according to an embodiment of the present invention.

FIG. 7 shows an autonomous landing apparatus of a UAV according to an embodiment of the present invention, which is applicable to a UAV. The UAV is the UAV 100 described in the foregoing embodiments. Functions of modules of the apparatus provided in this embodiment of the present invention are performed by the foregoing flight control system, and are used for implementing local detection of the UAV, thereby improving accuracy of detection and reducing a crash risk of the UAV during autonomous landing. The autonomous landing apparatus of a UAV includes:

an obtaining module 200, configured to obtain a point cloud distribution map of a planned landing region;

a first determining module 300, configured to determine a detection region in the point cloud distribution map according to an actual landing region of the UAV in the point cloud distribution map, the detection region being a region, used for detecting a quantity of point clouds, in the point cloud distribution map;

a division module 400, configured to divide the detection region into at least two designated regions, each of the at least two designated regions corresponding to a part of the planned landing region;

a second determining module 500, configured to determine whether a quantity of point clouds in each of the at least two designated regions is less than a preset threshold; and a control module 600, configured to: if a quantity of point clouds in a designated region is less than the preset threshold, control the UAV to fly away from the designated region of which the quantity of point clouds is less than the preset threshold, or control the UAV to stop landing.

In an embodiment of the present invention, the obtaining module 200 obtains the point cloud distribution map of the planned landing region by using a depth sensor of the UAV. Certainly, in some other alternative embodiments, the obtaining module 200 may be alternatively a depth sensor that can directly obtain the point cloud distribution map of the planned landing region.

In an embodiment of the present invention, the obtaining module 200 is further configured to:

obtain a depth map of the planned landing region by using the depth sensor; and obtain the point cloud distribution map according to the depth map.

In another embodiment of the present invention, the obtaining module 200 is further configured to:

obtain point cloud data of the planned landing region by using the depth sensor; and project the point cloud data to a two-dimensional plane, to obtain the point cloud distribution map.

In an embodiment of the present invention, the detection region is obtained by subtracting the actual landing region from a region corresponding to the point cloud distribution map and adding a region formed by a tolerable danger error.

In an embodiment of the present invention, the point cloud distribution map is of a rectangular structure, and the at least two designated regions include:

a first designated region located on a left side of a landing region, a second designated region located on a right side of the landing region, a third designated region located on an upper side of the landing region and a fourth designated region located on a lower side of the landing region.

In an embodiment of the present invention, the detection region does not include regions in which four corners are located in the point cloud distribution map.

In an embodiment of the present invention, mathematical expressions of the first designated region S1, the second designated region S2, the third designated region S3 and the fourth designated region S4 are respectively as follows:

$$-\text{length} < x_1 < -(l-d), y_1 < |w-d|, \qquad \text{S1:}$$

$$(l-d) < x_2 < \text{length}, y_2 < |w-d|, \qquad \text{S2:}$$

$$x_3 < |l-d|, (w-d) < y_3 < \text{width}, \qquad \text{S3: and}$$

$$x_4 < |l-d|, -\text{width} < y_4 < -(w-d), \qquad \text{S4:}$$

where $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

In an embodiment of the present invention, the preset threshold is a value within a range of 15 to 50.

Certainly, in some other alternative embodiments, the obtaining module 200 may be a depth sensor that directly obtains the point cloud distribution map of the planned landing region. The first determining module 300, the division module 400, the second determining module 500 and the control module 600 may be flight control chips.

The apparatus embodiment and the method embodiment are based on the same concept. Therefore, for the content of the apparatus embodiment, reference may be made to the method embodiment without mutual conflict among content, and details are not described herein again.

In this embodiment of the present invention, designated regions are obtained through division in a point cloud distribution map of a planned landing region, and a quantity of point clouds in each designated region is determined to implement local detection. Compared with overall detection for the planned landing region, during the local detection for a designated region, there are a smaller quantity of point clouds, so that the UAV can determine each dangerous designated region more accurately, thereby improving accuracy of detection and reducing a crash risk of the UAV.

Embodiment 4

Figure 8:
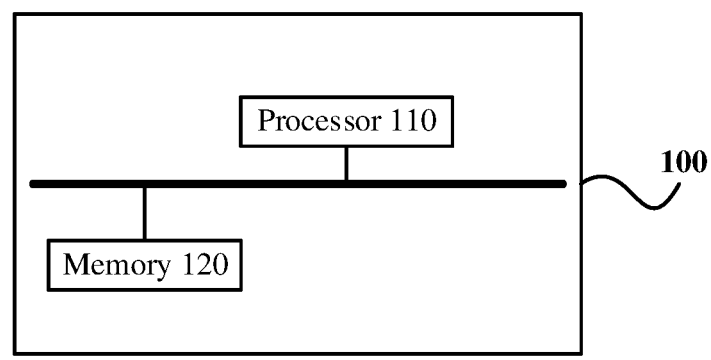
FIG. 8 is a schematic structural diagram of hardware of a UAV according to an embodiment of the present invention.

FIG. 8 is a schematic structural diagram of hardware of a UAV according to an embodiment of the present invention. The UAV 100 can perform the autonomous landing method of a UAV according to the foregoing embodiments and can further implement functions of the modules of the autonomous landing apparatus of a UAV according to the foregoing embodiments. The UAV 100 includes:

one or more processors 110 and a memory 120. In FIG. 8, one processor 110 is used as an example.

The processor 110 and the memory 120 may be connected by a bus or in another manner. A connection by the bus is used as an example in FIG. 8.

As a non-volatile computer-readable storage medium, the memory 120 may be configured to store a non-volatile software program, a non-volatile computer executable program and a module, for example, program instructions corresponding to the autonomous landing method of a UAV and the modules (for example, the obtaining module 200, the first determining module 300, the division module 400, the second determining module 500, the control module 600 and the like) corresponding to the autonomous landing apparatus of a UAV in the foregoing embodiments of the present invention. The processor 110 performs various functional applications and data processing of the autonomous landing method of a UAV by executing a non-volatile software program, an instruction and a module stored in the memory 120, that is, implements the autonomous landing method of a UAV in the foregoing method embodiment and the functions of the modules of the foregoing apparatus embodiment.

The memory 120 may include a program storage area and a data storage area. The program storage area may store an operating system and an application that is required by at least one function. The data storage area may store data created according to use of the autonomous landing apparatus of a UAV and the like.

The storage data area further stores preset data, including a preset threshold and the like.

In addition, the memory 120 may include a high-speed random access memory, and may further include a non-volatile memory, such as at least one magnetic disk storage device, a flash memory, or another non-volatile solid-state storage device. In some embodiments, the memory 120 optionally includes memories disposed remote to the processor 110, and these remote memories may be connected to the processor 110 through a network. Examples of the network include, but are not limited to, the Internet, an intranet, a local area network, a mobile communication network and a combination thereof.

The program instruction and one or more modules are stored in the memory 120, and the program instruction and the one or more modules, when being executed by the one or more processors 110, perform steps of the autonomous landing method of a UAV in any of the foregoing method embodiments, or implement functions of the modules of the autonomous landing apparatus of a UAV in any of the foregoing apparatus embodiments.

For the foregoing product, the method provided in the embodiments of the present invention may be performed, and the corresponding functional modules for performing the method and beneficial effects thereof are provided. For technical details not described in detail in this embodiment, reference may be made to the method provided in the foregoing embodiments of the present invention.

The embodiments of the present invention further provide a non-volatile computer-readable storage medium, storing computer-executable instructions. The computer-executable instructions, when being executed by one or more processors such as one processor 110 in FIG. 8, may cause a computer to perform steps of the autonomous landing method of a UAV in any of the foregoing method embodiments, or implement functions of the modules of the autonomous landing apparatus of a UAV in any of the foregoing apparatus embodiments.

The embodiments of the present invention further provide a computer program product, including a computer program stored in a non-volatile computer-readable storage medium. The computer program includes program instructions, and the program instructions, when being executed by one or more processors such as one processor 110 in FIG. 8, may cause a computer to perform steps of the autonomous landing method of a UAV in any of the foregoing method embodiments, or implement functions of the modules of the autonomous landing apparatus of a UAV in any of the foregoing apparatus embodiments.

The described apparatus embodiment is merely an example. The modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments.

Through the description of the foregoing embodiments, a person of ordinary skill in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the implementations of the foregoing methods may be performed. The foregoing storage medium may be a magnetic disk, an optical disc, a read-only memory (ROM), a random access memory (RAM) or the like.

The foregoing descriptions are embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, persons of ordinary skill in the art should understand that they may still make modifications to the technical solutions described in the foregoing embodiments or make equivalent replacements to some technical features thereof without departing from the scope of the technical solutions of the embodiments of the present application.

What is claimed is:

1. An autonomous landing method of an unmanned aerial vehicle (UAV), comprising:
    obtaining a point cloud distribution map of a planned landing region;
    determining a detection region in the point cloud distribution map according to an actual landing region of the UAV in the point cloud distribution map, the detection region being a region, used for detecting a quantity of point clouds, in the point cloud distribution map;
    dividing the detection region into at least two designated regions, each of the at least two designated regions corresponding to a part of the planned landing region;
    determining whether a quantity of point clouds in each of the at least two designated regions is less than a preset threshold wherein the reset threshold value is seater than 1, and
    when a quantity of point clouds in a designated region is less than the preset threshold, controlling the UAV to fly away from the designated region of which the quantity of point clouds is less than the preset threshold, or controlling the UAV to stop landing.

2. The autonomous landing method of the UAV according to claim 1, wherein the obtaining a point cloud distribution map of a planned landing region comprises:
    obtaining the point cloud distribution map of the planned landing region by using a depth sensor of the UAV.

3. The autonomous landing method of the UAV according to claim 2, wherein the obtaining the point cloud distribution map of the planned landing region by using a depth sensor of the UAV comprises:
    obtaining a depth map of the planned landing region by using the depth sensor; and
    obtaining the point cloud distribution map according to the depth map.

4. The autonomous landing method of the UAV according to claim 2, wherein the obtaining the point cloud distribution map of the planned landing region by using a depth sensor of the UAV comprises:
    obtaining point cloud data of the planned landing region by using the depth sensor; and
    projecting the point cloud data to a two-dimensional plane, to obtain the point cloud distribution map.

5. The autonomous landing method of the UAV according to claim 1, wherein the detection region is obtained by subtracting the actual landing region from a region corresponding to the point cloud distribution map and adding a region formed by a tolerable danger error.

6. The autonomous landing method of the UAV according to claim 1, wherein the point cloud distribution map is of a rectangular structure, and the at least two designated regions comprise:
    a first designated region located on a left side of a landing region, a second designated region located on a right side of the landing region, a third designated region located on an upper side of the landing region and a fourth designated region located on a lower side of the landing region.

7. The autonomous landing method of the UAV according to claim 6, wherein the detection region does not comprise regions in which four corners are located in the point cloud distribution map.

8. The autonomous landing method of the UAV according to claim 7, wherein mathematical expressions of the first designated region S1, the second designated region S2, the third designated region S3 and the fourth designated region S4 are respectively as follows:

$$-\text{length} < x_1 < -(l-d), y_1 < |w-d|, \qquad \text{S1:}$$

$$(l-d) < x_2 < \text{length}, y_2 < |w-d|, \qquad \text{S2:}$$

$$x_3 < |l-d|, (w-d) < y_3 < \text{width}, \qquad \text{S3: and}$$

$$x_4 < |l-d|, -\text{width} < y_4 < -(w-d), \qquad \text{S4:}$$

wherein $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

9. The autonomous landing method of the UAV according to claim 1, wherein the preset threshold is a value within a range of 15 to 50.

10. An autonomous landing apparatus of an unmanned aerial vehicle (UAV), comprising:
    a processor, configured to: obtain a point cloud distribution map of a planned landing region;
    determine a detection region in the point cloud distribution map according to an actual landing region of the UAV in the point cloud distribution map, the detection region being a region, used for detecting a quantity of point clouds, in the point cloud distribution map;
    divide the detection region into at least two designated regions, each of the at least two designated regions corresponding to a part of the planned landing region;
    determine whether a quantity of point clouds in each of the at least two designated regions is less than a preset threshold, wherein the preset threshold value is greater than 1; and
    when a quantity of point clouds in a designated region is less than the preset threshold, control the UAV to fly away from the designated region of which the quantity of point clouds is less than the preset threshold, or control the UAV to stop landing.

11. The autonomous landing apparatus of the UAV according to claim 10, wherein the processor obtains the point cloud distribution map of the planned landing region by using a depth sensor of the UAV.

12. The autonomous landing apparatus of the UAV according to claim 11, wherein the processor is further configured to:
    obtain a depth map of the planned landing region by using the depth sensor; and obtain the point cloud distribution map according to the depth map.

13. The autonomous landing apparatus of the UAV according to claim 11, wherein the processor is further configured to:
obtain point cloud data of the planned landing region by using the depth sensor; and
project the point cloud data to a two-dimensional plane, to obtain the point cloud distribution map.

14. The autonomous landing apparatus of the UAV according to claim 10, wherein the detection region is obtained by subtracting the actual landing region from a region corresponding to the point cloud distribution map and adding a region formed by a tolerable danger error.

15. The autonomous landing apparatus of the UAV according to claim 10, wherein the point cloud distribution map is of a rectangular structure, and the at least two designated regions comprise:
a first designated region located on a left side of a landing region, a second designated region located on a right side of the landing region, a third designated region located on an upper side of the landing region and a fourth designated region located on a lower side of the landing region.

16. The autonomous landing apparatus of the UAV according to claim 15, wherein the detection region does not comprise regions in which four corners are located in the point cloud distribution map.

17. The autonomous landing apparatus of the UAV according to claim 16, wherein mathematical expressions of the first designated region S1, the second designated region S2, the third designated region S3 and the fourth designated region S4 are respectively as follows:

$$-length < x_1 < -(l-d), y_1 < |w-d|, \qquad S1:$$

$$(l-d) < x_2 < length, y_2 < |w-d|, \qquad S2:$$

$$x_3 < |l-d|, (w-d) < y_3 < width, \qquad S3: \text{ and}$$

$$x_4 < |l-d|, -width < y_4 < -(w-d), \qquad S4:$$

wherein $x_1$ is a horizontal coordinate of a point within the first designated region S1, $y_1$ is a vertical coordinate of the point within the first designated region S1, $x_2$ is a horizontal coordinate of a point within the second designated region S2, $y_2$ is a vertical coordinate of the point within the second designated region S2, $x_3$ is a horizontal coordinate of a point within the third designated region S3, $y_3$ is a vertical coordinate of the point within the third designated region S3, $x_4$ is a horizontal coordinate of a point within the fourth designated region S4, $y_4$ is a vertical coordinate of the point within the fourth designated region S4, length is a half of a length of the point cloud distribution map, width is a half of a width of the point cloud distribution map, l is a half of a length of the actual landing region, w is a half of a width of the actual landing region, and d is a tolerable danger error.

18. The autonomous landing apparatus of the UAV according to claim 10, wherein the preset threshold is a value within a range of 15 to 50.

19. An unmanned aerial vehicle (UAV), comprising:
at least one processor; and
a memory communicatively connected to the at least one processor, the memory storing instructions executable by the at least one processor, the instructions being executed by the at least one processor, to enable the at least one processor to be configured to:
obtain a point cloud distribution map of a planned landing region;
determine a detection region in the point cloud distribution map according to an actual landing region of the UAV in the point cloud distribution map, the detection region being a region, used for detecting a quantity of point clouds, in the point cloud distribution map;
divide the detection region into at least two designated regions, each of the at least two designated regions corresponding to a part of the planned landing region;
determine whether a quantity of point clouds in each of the at least two designated regions is less than a preset threshold, wherein the preset threshold value is greater than 1; and
when a quantity of point clouds in a designated region is less than the preset threshold, control the UAV to fly away from the designated region of which the quantity of point clouds is less than the preset threshold, or controlling the UAV to stop landing.

20. A non-volatile computer-readable storage medium, storing computer-executable instructions, the computer-executable instructions being configured to cause an unmanned aerial vehicle (UAV) to perform the following steps:
obtaining a point cloud distribution map of a planned landing region;
determining a detection region in the point cloud distribution map according to an actual landing region of the UAV in the point cloud distribution map, the detection region being a region, used for detecting a quantity of point clouds, in the point cloud distribution map;
dividing the detection region into at least two designated regions, each of the at least two designated regions corresponding to a part of the planned landing region;
determining whether a quantity of point clouds in each of the at least two designated regions is less than a preset threshold wherein the reset threshold value is greater than 1; and
when a quantity of point clouds in a designated region is less than the preset threshold, controlling the UAV to fly away from the designated region of which the quantity of point clouds is less than the preset threshold, or controlling the UAV to stop landing.

* * * * *